United States Patent
Welday, Jr. et al.

(10) Patent No.: US 10,110,577 B2
(45) Date of Patent: Oct. 23, 2018

(54) NON-NATIVE DEVICE AUTHENTICATION

(71) Applicant: AT&T Intellectual Property I, L.P., Atlanta, GA (US)

(72) Inventors: Richard Welday, Jr., Plano, TX (US); Robert Alan Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 214 days.

(21) Appl. No.: 13/708,082

(22) Filed: Dec. 7, 2012

(65) Prior Publication Data

US 2014/0165151 A1 Jun. 12, 2014

(51) Int. Cl.
*H04L 29/06* (2006.01)

(52) U.S. Cl.
CPC .................... *H04L 63/08* (2013.01)

(58) Field of Classification Search
USPC .............. 726/4, 5, 10, 21, 28; 713/155, 185; 705/67
See application file for complete search history.

(56) References Cited

U.S. PATENT DOCUMENTS

| | | | | |
|---|---|---|---|---|
| 6,931,463 | B2 | 8/2005 | Striemer | |
| 7,817,988 | B2* | 10/2010 | Kruis | H04W 4/24 455/412.1 |
| 8,121,945 | B2* | 2/2012 | Rackley, III | G06Q 20/042 235/380 |
| 8,423,096 | B1* | 4/2013 | Rao | G06F 21/32 361/679.55 |
| 8,606,232 | B2* | 12/2013 | Siu | H04W 8/205 455/411 |
| 8,819,848 | B2* | 8/2014 | Moore | 726/28 |
| 9,131,327 | B2* | 9/2015 | Abdelsamie | H04W 4/001 |
| 2003/0055785 | A1 | 3/2003 | Lahiri | |
| 2008/0034064 | A1* | 2/2008 | Choi | G06F 21/10 709/219 |
| 2011/0151835 | A1 | 6/2011 | Velusamy | |
| 2012/0297466 | A1* | 11/2012 | Li | G06F 21/10 726/7 |

\* cited by examiner

*Primary Examiner* — Hadi S Armouche
*Assistant Examiner* — Paul E Callahan
(74) *Attorney, Agent, or Firm* — Hartman & Citrin LLC

(57) ABSTRACT

Concepts and technologies are described herein that involve non-native device authentication. According to one aspect disclosed herein, a method can include receiving an authentication credential at a computing device from an authorizer. The computing device can be non-native to the authorizer and native to an authorizee that the authorizer is attempting to provide authorization for access to content associated with the authorizer. The method can also include generating an authentication request directed to an authentication system. The authentication request can include the authentication credential. The method can also include sending the authentication request to the authentication system. In response to the authentication request, the computing system can receive an indication that the authorizer is authenticated to authorize the authorizee for access to the content associated with the authorizer. The method can also include accessing, by the computing device, the content associated with the authorizer.

17 Claims, 4 Drawing Sheets

NON-NATIVE DEVICE AUTHENTICATION

BACKGROUND

The concepts and technologies disclosed herein generally relate to authentication mechanisms. More specifically, the concepts and technologies disclosed herein relate to non-native device authentication.

Authentication mechanisms play a vital role in mitigating fraudulent activity. Some authentication mechanisms utilize a single factor authentication scheme, while others utilize a multi-factor authentication scheme. A common authentication scheme employs a "something one knows" authentication factor to provide access to an account, such as an email account, via a username and password. Other factors such as "something one has" and "something one is" are employed from time to time to increase protection against fraudulent activity.

SUMMARY

Concepts and technologies are described herein that involve non-native device authentication. According to one aspect described herein, a method can include receiving an authentication credential at a computing device that is non-native to an authorizer that provides the authentication credential and native to an authorizee that the authorizer is attempting to authorize for access, via the computing device, to content associated with the authorizer. As used herein, a computing device is "non-native" to a user when the computing device is not owned by the user (e.g., has not been purchased by or for the user), or when the computing device is owned by the user (e.g., has been purchased by or for the user) but not yet been provisioned for the user. As used herein, a computing device is "native" to a user when the computing device is owned by the user (e.g., has been purchased by or for the user) and has been provisioned for the user. The method can also include generating, by the computing device, an authentication request directed to an authentication system. The authentication request can include the authentication credential. The method can also include sending the authentication request to the authentication system. In response to the authentication request, the computing system can receive an indication that the authorizer is authenticated to authorize the authorizee for access to the content associated with the authorizer. The method can also include accessing, by the computing device, the content associated with the authorizer.

In some embodiments, the content associated with the authorizer includes content stored on a second computing device that is native to the authorizer. In these embodiments, the computing device can initiate the establishment of a data connection with the second computing device, request the content stored on the second computing device via the data connection, and receive the content stored on the second computing device via the data connection. The content received by the computing device may be stored on the computing device. Alternatively, the content may be streamed by the computing device from the second computing device.

In some embodiments, the content associated with the authorizer includes content associated with a service with which the authorizer is associated. In these embodiments, the computing device can initiate the establishment of a data connection with a content source involved in providing the service, request the content associated with the service, and receive the content associated with the service via the data connection. The content received by the computing device may be stored on the computing device. Alternatively, the content may be streamed by the computing device from the content source.

In some embodiments, the method can also include receiving a selection of the content associated with the authorizer. In these embodiments, the computing device accesses the content identified by the selection. The selection may be provided by the authorizer after the computing device receives the authentication response. Alternatively, the selection may be a pre-selection by the authorizer of the content.

According to another aspect described herein, a computing device includes a processor and a memory. The memory can include computer-executable instructions that, when executed by the processor, cause the processor to perform operations. The operations can include receiving an authentication credential from an authorizer to which the computing device is non-native. The authentication credential can be for an attempt, by the authorizer, to authorize an authorizee for access, via the computing device, to content associated with the authorizer. The operations can also include generating an authentication request directed to an authentication system. The authentication request can include the authentication credential. The operations can also include sending the authentication request to the authentication system. The operations can also include receiving an authentication response from the authentication system. The authentication response can include an indication that the authorizer is authenticated to authorize the authorizee for access to the content associated with the authorizer. The operations can also include accessing the content associated with the authorizer.

According to another aspect disclosed herein, a computer-readable storage medium includes instructions that, when executed by a processor of a computer system, cause the processor to perform operations. The operations can include receiving an authentication credential from an authorizer to which the computing device is non-native. The authentication credential can be for an attempt, by the authorizer, to authorize an authorizee for access, via the computing device, to content associated with the authorizer. The operations can also include generating an authentication request directed to an authentication system. The authentication request can include the authentication credential. The operations can also include sending the authentication request to the authentication system. The operations can also include receiving an authentication response from the authentication system. The authentication response can include an indication that the authorizer is authenticated to authorize the authorizee for access to the content associated with the authorizer. The operations can also include accessing the content associated with the authorizer.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
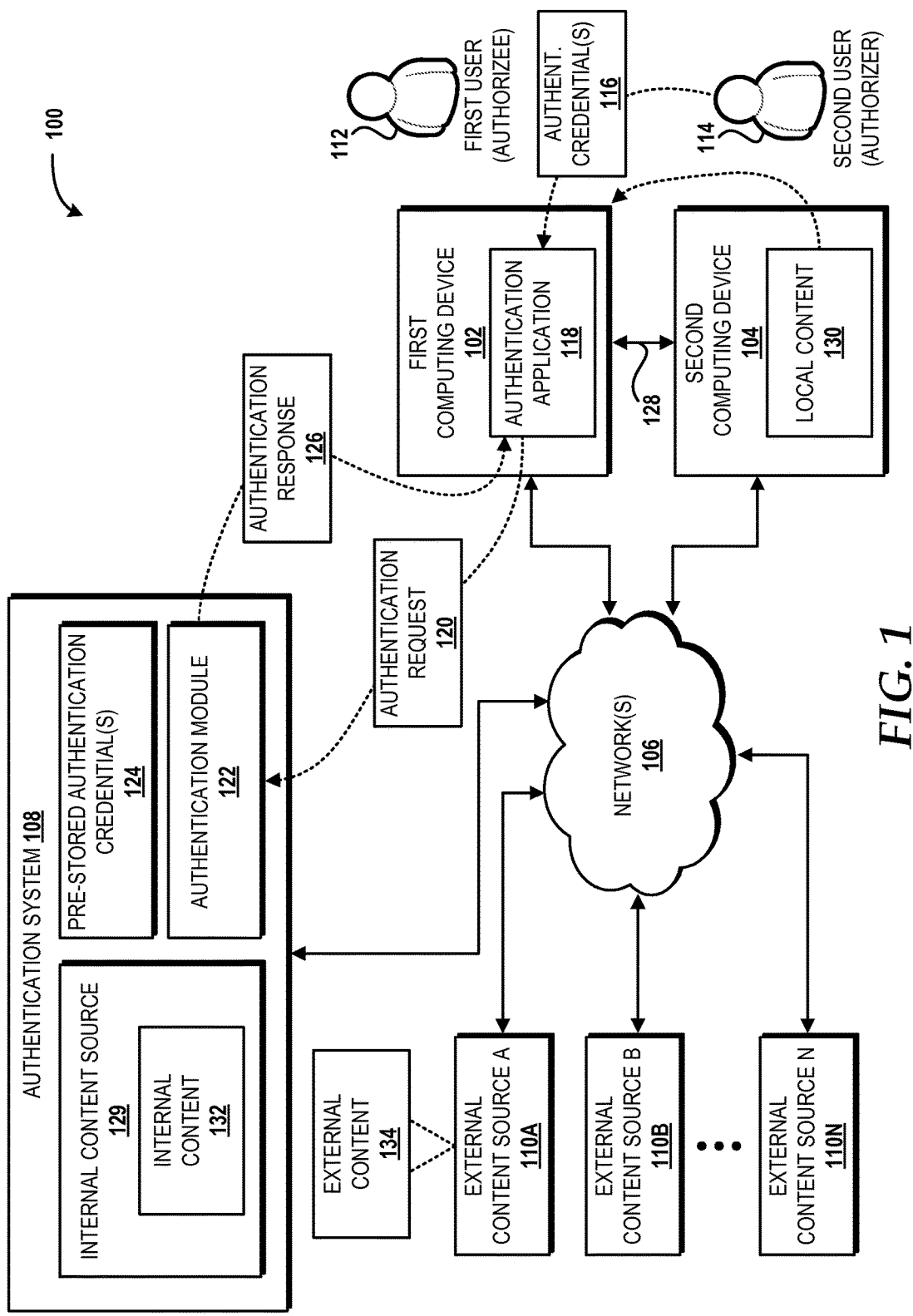
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of non-native device authentication will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a first computing device 102 and a second computing device 104, each of which is operating on or in communication with one or more networks 106 (hereinafter referred to collectively or generically as "network 106"). The first computing device 102 and the second computing device 104 each can be a desktop computer, an all-in-one computer, a laptop computer, a notebook computer, a netbook computer, an ultrabook computer, a tablet computer, a cellular telephone, a smartphone, a feature phone, a personal digital assistant ("PDA"), a video game console, a handheld video game console, a smart television (i.e., a television with Internet connectivity), a set-top box (e.g., a cable, satellite, and/or DVR system), a television remote, or the like. The first computing device 102 and the second computing device 104 can be configured with one or more network access components that facilitate one or more connections to the network 106.

In some embodiments, the network 106 is or includes one or more wireless wide area networks ("WWANs"), such as one or more mobile telecommunications networks utilizing one or more mobile telecommunications technologies to provide voice and/or data services to the first computing device 102 and the second computing device 104 via respective WWAN components (not shown). The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 106 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like.

Data communications may be provided by the network 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards.

The network 106 may be configured to provide voice and/or data communications with any combination of the above technologies. The network 106 may be configured to or adapted to provide voice and/or data communications in accordance with future generation technologies. The network 106 additionally or alternatively may be or may include one or more wired WANs.

In some embodiments, the network 106 is or includes a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. Connections to the network 106 embodied as a WLAN may be secured via various encryption technologies including, but not limited, WI-FI Protected Access ("WPA"), WPA2, Wired Equivalent Privacy ("WEP"), and the like. In some embodiments, the network 106 is or includes a wired LAN operating, for example, via IEEE 802.3 "Ethernet." Other wired networking technologies are contemplated.

In some embodiments, the network 106 is or includes one or more internets, the Internet, one or more intranets, one or more extranets, and/or one or more other packet data networks. It should be understood that the network 106 is intended to be representative of any number of the above networks, alone or in any combination, to facilitate, at least in part, communications between the first computing device 102 and the second computing device 104, and to facilitate communications between the first computing device 102 and an authentication system 108 and/or one or more external content sources 110A-110N. The second computing device 104 may also communicate with the authentication system 108 and/or one or more of the external content sources 110A-110N.

In the illustrated embodiment, the first computing device 102 is associated with a first user 112, and the second computing device 104 is associated with a second user 114. The first computing device 102 is non-native to the second user 114. As used herein, a computing device is "non-native" to a user when the computing device is not owned by the user (e.g., has not been purchased by or for the user), or when the computing device is owned by the user (e.g., has been purchased by or for the user) but not yet been provisioned for the user. The provisioning of a computing device can broadly encompass the act of preparing or setting up of a computing device for use by a particular user or group of users. For example, a smartphone that has been purchased by or for a user but has not yet undergone an activation process to establish communication with a mobile telecommunication network for the first time on behalf of the user can be referred to as a computing device that has not yet been provisioned. As another example, a laptop or other computer that has been purchased by or for a user but has not yet gone through an initial setup process, such as the creation of a user account on first boot, can be referred to as a computing device that has not yet been provisioned.

The second computing device 104 is native to the second user 114. As used herein, a computing device is "native" to a user when the computing device is owned by the user (e.g., has been purchased by or for the user) and has been provisioned for the user. Similarly, the first computing device 102 is native to the first user 112. For example, a smartphone that has been purchased by or for a user and has undergone an activation process to establish communication with a mobile telecommunication network for the first time on behalf of the user can be referred to as a computing device that has been provisioned. As another example, a laptop or other computer that has been purchased by or for a user and has gone through an initial setup process, such as the creation of a user account on first boot, can be referred to as a computing device that has been provisioned.

The illustrated second user 114 is an authorizer to the first user 112. As used herein, an "authorizer" is an entity that uses a non-native device to affect an authorization directly on a non-native device for access, by another entity, to content that is associated with the entity via the non-native device. In the illustrated embodiment, the second user 114 is an entity that uses the first computing device 102, which is non-native to the second user 114 and native to the first user 112, to affect an authorization directly on the first computing device 102 for access, by the first user 112, to content that is associated with the second user 114 via the first computing device 102.

The illustrated first user 112 is an authorizee to the second user 114. As used herein, an "authorizee" is an entity that receives authorization, on a native device, from another entity for access to content that is associated with that entity via the native device. In the illustrated embodiment, the first user 112 is an entity that receives authorization, on the first computing device 102, which is native to the first user 112 and non-native to the second user 114, from the second user 114, for access to content that is associated with the second user 114 via the first computing device 102.

In the illustrated embodiment, the second user 114 can provide one or more authentication credentials 116 to an authentication application 118 that is executed by one or more processors of the first computing device 102. The authentication credential(s) 116 can include authentication credentials for use with any authentication scheme, which may be single or multi-factor. The authentication credential(s) 116 may fall into one or more of the following categories: something one has, something one is, something one knows, and/or somewhere one is located.

In some embodiments, the something one has category of authentication factors can include a key fob, smart card, dongle, or other hardware token. A hardware token can be configured to communicate with a computing device via one or more wired or wireless connections to provide a security token as part of an authentication scheme.

In some embodiments, the something one is category of authentication factors includes biometric authentication factors that are used to uniquely identify an authorizer based upon one or more intrinsic physical or behavioral traits of the authorizer. Exemplary biometrics include, but are not limited to, voice print, fingerprint, palm print, hand geometry, retina recognition, iris recognition, odor/scent recognition, typing rhythm, gait, and the like.

As used herein, speech recognition refers to translating audio signals into words. Speaker verification, as used herein, refers to the use of speech as a biometric. In some embodiments, speaker verification uses speech recognition as a step thereof. Moreover, speaker verification includes matching speech input to a voice print with or without the use of speech recognition. A match may be determined, at least in part, upon a scale such as, but not limited to, a percentage or a score. The scale may be set by the MFA service provider or by some other entity. As also used herein, speaker recognition refers to grouping audio files into a set of audio files associated with individual speakers.

In some embodiments, a biometric authentication factor includes a voice print created utilizing a voice print technology or some other speech recognition and/or speaker verification engine to generate a unique voice print of an individual for use in later authentication of that individual as part of the multi-factor authentication scheme. In some embodiments, authentication attempts after the initial creation of the voice print contribute to the voice print to improve the accuracy of the voice print and to contribute to a final voice print match determination during an authentication procedure. In some embodiments, a match to the voice print is determined at least in part by matching a user's repetition of random statements. This can thwart the malicious use of recorded voice in attempts to spoof a voice for authentication.

The something one knows category of authentication factors includes information an individual knows, such as, but not limited to, a password, a personal identification number ("PIN"), a passphrase, an answer to a challenge question that others are unlikely to know, and a one-time pass key or a passphrase provided to the individual in a previous authenticated session. In some embodiments, the something one knows category is combined with a voice print authentication factor such that, for example, a password or an answer to a challenge question is spoken and compared to a voiceprint in addition to determining if the password or the answer is correct.

The somewhere one is category of authentication factors includes a geographic location of an individual as determined, for example, by a location determining component such as a global positioning system ("GPS") sensor included in the first computing device 102. Other location determining techniques such as cellular triangulation techniques, WI-FI triangulation techniques, WI-MAX triangulation techniques, and assisted-GPS may be utilized by the first computing device 102 alone or in combination with a GPS sensor to provide location information as an authentication factor.

The authentication application 118 can receive the authentication credential(s) 116 from the second user 114 and generate an authentication request 120 that includes the authentication credential(s) 116. The first computing device 102 can send the authentication request 120 to the authentication system 108. The authentication system 108 can execute, by one or more processors, an authentication module 122 that compares the authentication credential(s) 116 to one or more pre-stored authentication credentials 124 to authenticate the identity of the second user 114 so that the second user 114 can authorize the first user 112 to access content associated with the second user 114.

If the authentication module 122 determines that a match does not exist between the authentication credential(s) 116 and the pre-stored authentication credentials 124, the authentication module 122 can generate an authentication response 126 that includes an indication that the authentication credential(s) 116 is/are incorrect for the second user 114. The authentication system 108 can send the authentication response 126 to the first computing device 102. The first computing device 102 can receive the authentication response 126 and can present, via the authentication application 118, the indication that the authentication credential(s) 116 is/are incorrect for the second user 114. The second user 114 can then attempt to provide one or more other authentication credentials to the authentication application 118 in a further attempt to authorize the first user 112 for access to content associated with the second user 114. The authentication application 118 can generate one or more additional authentication requests, which may be similar in format to the authentication request 120, to provide the other authentication credential(s) to the authentication system 108 for one or more additional authentication attempts. In some embodiments, the authentication application 118 may limit the number of attempts made by the second user 114.

If the authentication module 122 determines that a match does exist between the authentication credential(s) 116 and the pre-stored authentication credentials 124, the authentication module 122 can generate the authentication response 126 that includes an indication that the authentication credential(s) 116 is/are correct for the second user 114. The authentication system 108 can send the authentication response 126 to the first computing device 102. The first computing device 102 can receive the authentication response 126 and can present, via the authentication application 118, the indication that the authentication credential(s) 116 is/are correct for the second user 114.

In some embodiments, after the authentication application 118 receives an indication that the second user 114 is authenticated to authorize the first user 112 for access to content associated with the second user 114, the authentication application 118 can provide a user interface through which the second user 114 can provide a location at which the first computing device 102 should access content associated with the second user 114. For example, the authentication application 118 can provide a user interface through which the second user 114 can enter a device identifier (e.g., a MAC address, an IP address, or a telephone number) for or select a representation (e.g., text description, icon, or a combination thereof) of the second computing device 104 from a list of one or more computing devices that are capable of communication with the first computing device 102 by way of a local connection 128. The local connection 128 can be created, for example, via BLUETOOTH, infrared, infrared data association ("IRDA"), ad-hoc WI-FI, near field communications ("NFC"), other RF technologies, any combination thereof, and/or the like. Alternatively or additionally, for example, the authentication application 118 can provide a user interface through which the second user 114 can enter or select one or more of the external content sources 110A-110N as the location(s) at which the first computing device 102 should access content associated with the second user 114. Alternatively or additionally, for example, the authentication application 118 can provide a user interface through which the second user 114 can provide or select an internal content source 129 of the authentication system 108 as the location at which the first computing device 102 should access content associated with the second user 114.

As an alternative to selecting one or more locations at which the first computing device 102 should access content associated with the second user 114, the second user 114 can pre-select content from any of the aforementioned locations—the second computing device 104, one or more of the external content sources 110A-110N, and/or the internal content source 129. In this manner, the authentication application 118, after receipt of the authentication response 126 that indicates the second user 114 is authenticated to authorize the first user 112 to access content associated with the second user 114, can direct the first computing device 102 to one or more pre-selected locations at which the first computing device 102 should access content associated with the second user 114. The pre-selected locations can be identified in the authentication response 126 or in another communication received from the authentication system 108.

Content associated with the second user 114 can include, but is not limited to, documents, photos, videos, music, contact list information, device configuration data, applications, electronic tickets, electronic payment credentials, electronic cash, gift certificates, promotional materials, device backup content, device provisioning content, any combination thereof, and/or the like. The content can be stored in one or more computer-readable storage media of the second computing device 104 as local content 130. Alternatively or additionally, the content can be stored in one or more computer-readable storage media of the internal content source 129 as internal content 132. The internal content source 128 may be co-located with the authentication system 108 as in the illustrated embodiment, or may be in communication with the authentication system 108. Alternatively or additionally, the content can be stored in one or more computer-readable storage media of one or more of the external content sources 110 as external content 134.

In some embodiments, the first computing device 102 can request the content (e.g., via authentication application 118) and receive the content from one or more of the aforementioned locations based upon a pre-selection or selection provided by the second user 114. In some other embodiments, the authentication application 118 can direct another application that is stored on the first computing device 102 or that is accessible by the first computing device 102 (e.g., via the network 106) to request the content from one or more of the aforementioned locations based upon a pre-selection or selection provided by the second user 114.

In some embodiments, the first computing device 102 receives content associated with the second user 114 and stores the content in one or more computer-readable storage media of the first computing device 102 or accessible by the first computing device 102 (e.g., one or more computer-readable storage media that are external to the first computing device 102). In some other embodiments, the first computing device 102 streams the content associated with the second user 114 and does not store the content. It should be understood, however, that, in streaming the content, the first computing device 102 may temporarily store at least a portion of the content in a buffer.

In some embodiments, the content is associated with a service with which the second user 114 is associated. For example, the content may be streaming media that is accessible via a streaming media service with which the second user 114 has an account. Other services, including, but not limited to, software-as-as-service, shopping services, banking services, travel services, entertainment services, online video game services, and the like are also contemplated. A service may be provided, at least in part, by one or more of the external content sources 110A-110N.

In some embodiments, the content is associated with a website with which the second user 114 is associated. For example, the website may require a username and password combination to access an account of the second user 114. The authentication affected by the second user 114 can authorize the first user 112 for access to the content associated with an account of the second user 114 without the second user 114 having to enter authentication credentials, such as username and password that are associated with the account of the second user 114.

In some embodiments, the first computing device 102 is a device to which the second user 114 is changing from the second computing device 104. For example, the first computing device 102 may be a new smartphone that the second user 114 has purchased but not yet provisioned or had provisioned, and the second computing device 104 may be an old smartphone that the second user 114 is replacing. In these embodiments, the first user 112 and the second user 114, acting as authorizee and authorizer, respectively, are the same user. In these embodiments, the first computing device 102 can obtain content so as to provision, at least in part, the first computing device 102. The content, in these embodiments, can include a device restore package that includes backup content generated by a backup operation performed, at least in part, by the second computing device 104. The content, in these embodiments, can alternatively or additionally include a new device package that includes information selected by the second user 114 during a purchase transaction of the first computing device 102. The first computing device 102 can utilize the device restore package and/or the new device package for provisioning.

In some embodiments, the second user 114 purchases the first computing device 102 with content associated with the second user 114 pre-installed on the first computing device 102. For example, during a checkout process, the second user 114 can select or otherwise identify content that he or she wants to have pre-installed. The content can be installed on the first computing device 102 prior to being provided to the second user 114. The second user 114 can then unlock the content via the authorization process described herein.

It should be understood that the first user 112 and the second user 114 need not be a human user. In some implementations, the first user 112 and/or the second user 114 is a robot user, a non-human animal, or another non-human entity.

Figure 2:
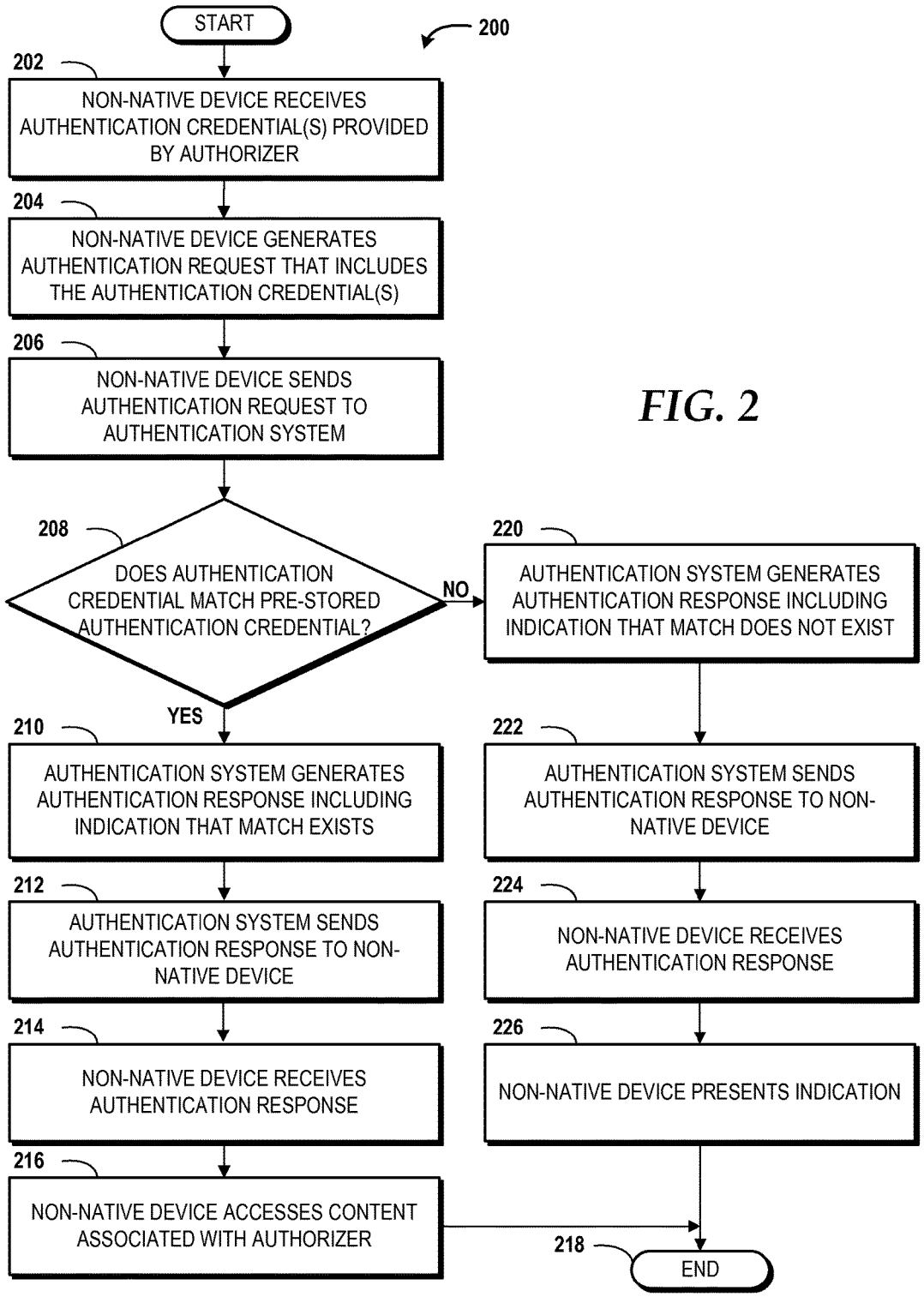
FIG. 2 is a flow diagram illustrating aspects of a method for non-native device authentication, according to an illustrative embodiment.

Turning now to FIG. 2, a flow diagram illustrating aspects of a method 200 for non-native device authentication will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like. As used herein, "cause a processor to perform operations" includes causing a processor of a computing system or computing device, such the first computing device 102, the second computing device 104, the authentication system 108, and/or one or more of the external content sources 110A-110N to perform one or more operations of the operations and/or causing the processor to direct other components of the computing system or computing device to perform one or more of the operations.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described below with additional reference to FIG. 1. The method 200 begins and proceeds to operation 202, wherein a computing device that is non-native to an authorizer ("non-native device" in FIG. 2) receives one or more authentication credentials provided by the authorizer. Referring briefly to FIG. 1, the second user 114 acting in the capacity of an authorizer can provide the authentication credential(s) 116 to the first computing device 102, which is a non-native device to the second user 114. These references are carried out through the remaining description of the method 200 merely for ease of explanation, and therefore should not be interpreted as being limiting in any way. From operation 202, the method 200 proceeds to operation 204, wherein the first computing device 102 generates the authentication request 120 that includes the authentication credential(s) 116. From operation 204, the method 200 proceeds to operation 206, wherein the first computing device 102 sends the authentication request 120 to the authentication system 108.

From operation 206, the method 200 proceeds to operation 208, wherein the authentication system 108 determines if the authentication credential(s) 116 included in the authentication request 120 match any of the pre-stored authentication credentials 124. If the authentication system 108 determines, at operation 208, that the authentication credential(s) 116 included in the authentication request 120 match any of the pre-stored authentication credentials 124, the method 200 proceeds to operation 210, wherein the authentication system 108 generates the authentication response 126 including an indication that a match exists. From operation 210, the method 200 proceeds to operation 212, wherein the authentication system 108 sends the authentication response 126 to the first computing device 102.

From operation 212, the method 200 proceeds to operation 214, wherein the first computing device 102 receives the authentication response 126 from the authentication system 108. From operation 214, the method 200 proceeds to operation 216, wherein the first computing device 102 accesses content associated with the second user 114. From operation 216, the method 200 proceeds to operation 218, wherein the method 200 may end.

If the authentication system 108 determines, at operation 208, that the authentication credential(s) 116 included in the authentication request 108 do not match any of the pre-stored authentication credentials 124, the method 200 proceeds to operation 220, wherein the authentication system 108 generates the authentication response 126 including an indication that a match does not exist. From operation 220, the method 200 proceeds to operation 222, wherein the authentication system 108 sends the authentication response 126 to the first computing device 102.

From operation 222, the method 200 proceeds to operation 224, wherein the first computing device 102 receives the authentication response 126. From operation 224, the method 200 proceeds to operation 226, wherein the first computing device 102 presents the indication that a match does not exist. In some embodiments, the second user 114 can provide other authentication credentials in further attempts to authorize the first user 112 for access to content associated with the second user 114. From operation 226, the method 200 proceeds to operation 218, wherein the method 200 may end.

Figure 3:
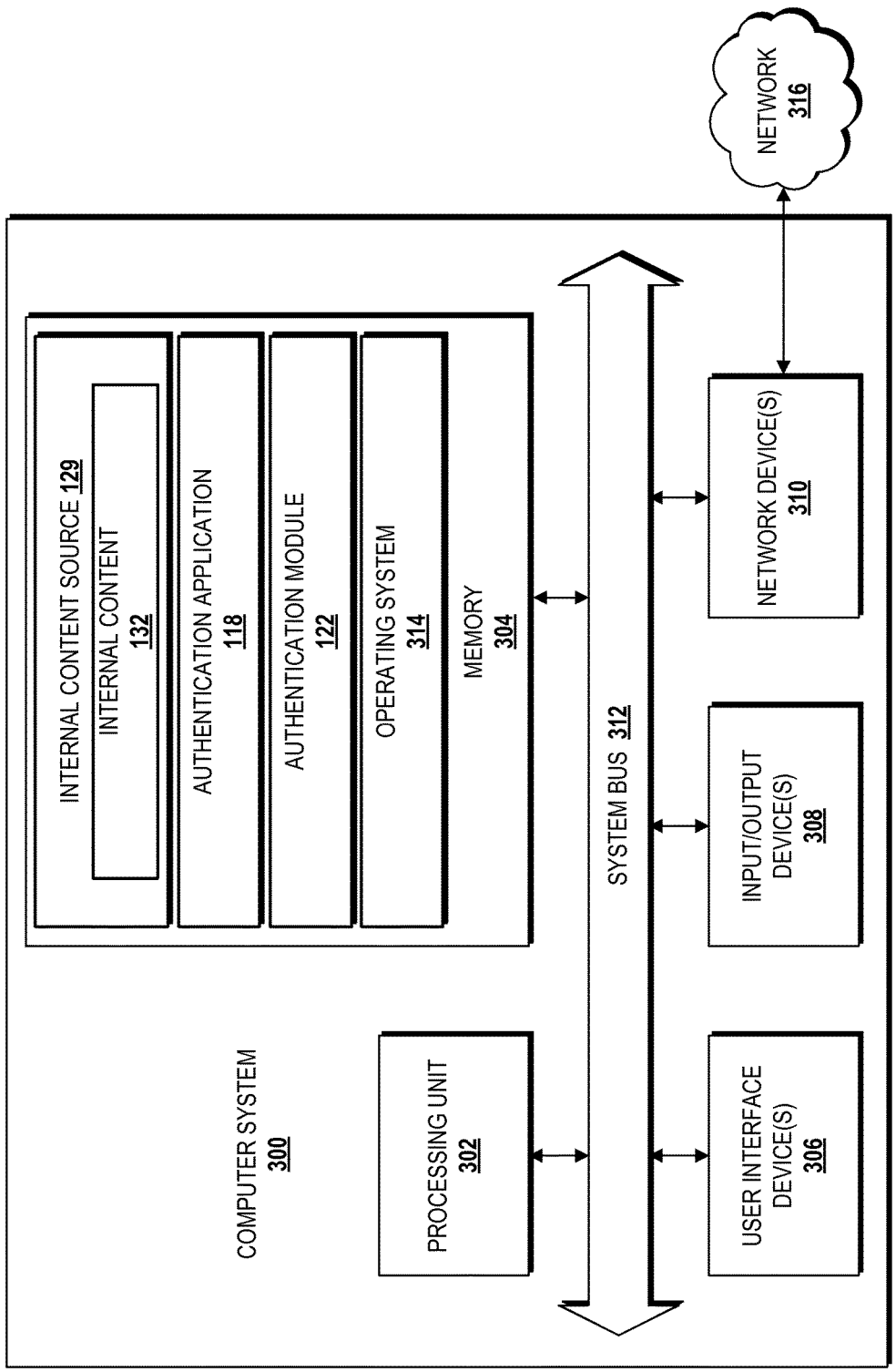
FIG. 3 is a block diagram illustrating an example computer system capable of implementing aspects of the embodiments presented herein.

FIG. 3 is a block diagram illustrating a computer system 300 configured to perform various operations disclosed herein. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310. In some embodiments, the authentication system 108, the first computing device 102, and/or the second computing device 104 are configured like the computer system 300. It should be understood, however, that the authentication system 108, the first computing device 102, and/or the second computing device 104 may include additional functionality or include less functionality than now described.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314, the authentication module 122, the authentication application 118, the internal content source 129, and the internal content 132. The authentication module 122, the authentication application 118, the internal content source 129, and the internal content 132 are shown together in the memory 304 merely for ease of illustration and description. In implementations, the authentication application 118 would be provided on the first computing device 102, and the authentication module 122, the internal content source 129, and the internal content 132 would be provided on the authentication system 108. The memory 304 can include additional applications for execution at least in part by the processing unit 302.

The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The authentication module 122 and the authentication application 118 can execute on top of the operating system 314 to provide functionality such as described herein above with reference to the method 200 illustrated in FIG. 2.

The user interface devices 306 may include one or more devices that a user utilizes to access the computer system 300. The user interface devices 306 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network 316, such as the network 106, illustrated and described with reference to FIG. 1, and/or other network(s). Examples of the network devices 310 include, but are not limited to, a modem, a radio frequency ("RF") or infrared ("IR") transceiver, a telephonic interface, a bridge, a router, or a network card. The network 316 may include other networks including a wireless network such as, but not limited to, a WLAN such as a WI-FI network, a WWAN, a wireless PAN ("WPAN") such as BLUETOOTH, or a wireless MAN ("WMAN"). Alternatively, the network 316 may include a wired network such as, but not limited to, a WAN such as the Internet, a LAN such as the Ethernet, a wired PAN, or a wired MAN.

Figure 4:
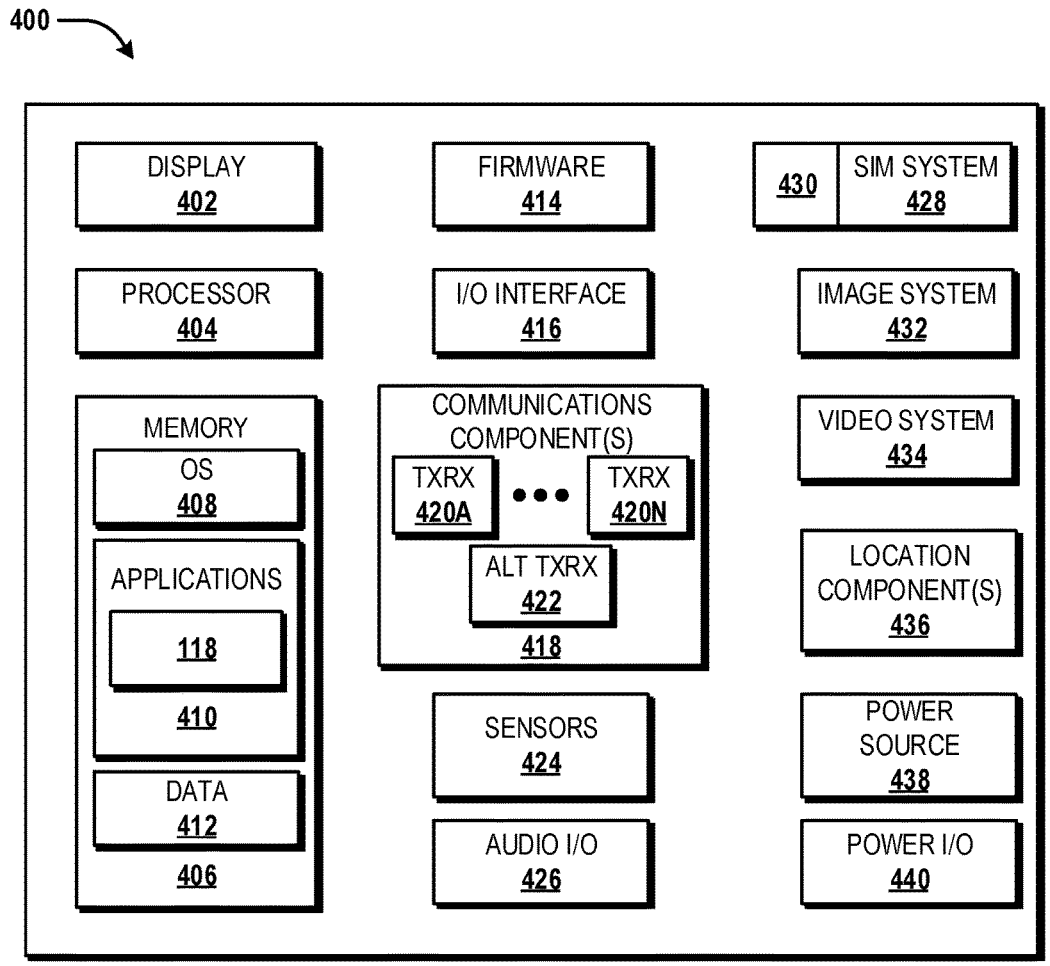
FIG. 4 is a block diagram illustrating an example mobile device capable of implementing aspects of the embodiments disclosed herein.

Turning now to FIG. 4, an illustrative mobile device 400 and components thereof will be described. In some embodiments, the first computing device 102 and/or the second computing device 104 described above with reference to FIG. 1 can be configured as and/or can have an architecture similar or identical to the mobile device 400 described herein in FIG. 4. It should be understood, however, that the mobile device 400 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408 and one or more applications 410, which may include the authentication application 118. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in answering/initiating calls, data communications, entering/deleting data, entering and setting user IDs and passwords for device access, configuring settings, manipulating address book content and/or settings, multi-mode interaction, interacting with other applications 410, and otherwise facilitating user interaction with the operating system 408, the applications 410, and/or other types or instances of data 412 that can be stored at the mobile device 400. The data 412 can include, for example, the local content 130 and/or other content associated with an authorizer. According to various embodiments, the applications 410 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as the network 106 described herein. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMAONE, CDMA2000, LTE, and various other 2G, 2.5G, 3G, 4G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, IRDA, NFC, other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from GPS devices, A-GPS devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Based on the foregoing, it should be appreciated that concepts and technologies that involve non-native device authentication have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising:
   receiving, via a user interface on a cellular telephone, an authentication credential as direct human input provided by a first user, who is acting as an authorizer, to affect an authorization for a second user to access, from the cellular telephone, content associated with the first user, wherein the cellular telephone is non-native to the first user in that the cellular telephone is not provisioned for the first user, and wherein the cellular telephone is native to the second user, who is acting as an authorizee, in that the cellular telephone is provisioned for the second user;
   in response to receiving, via the user interface, the authentication credential as direct human input provided by the first user, generating, by the cellular telephone, an authentication request directed to an authentication system, wherein the authentication request comprises the authentication credential;
   sending, by the cellular telephone, the authentication request to the authentication system;
   receiving, by the cellular telephone, an authentication response from the authentication system, wherein the authentication response indicates that the first user is authenticated to authorize the second user for access to the content associated with the first user from the cellular telephone, wherein the cellular telephone comprises a first cellular telephone that the second user is using to replace a second cellular telephone, wherein the first user, who is acting as the authorizer, and the second user, who is acting as the authorizee, are a same individual, and wherein the content comprises a new device software package comprising information selected by the second user during a purchase transaction of the first cellular telephone for provisioning, at least in part, the first cellular telephone;
   establishing a local data connection directly between the first cellular telephone and the second cellular telephone;
   requesting, by the first cellular telephone via the local data connection, the new device software package from the second cellular telephone; and
   receiving, at the first cellular telephone via the local data connection, the new device software package from the second cellular telephone.

2. The method of claim 1, further comprising storing, in a memory of the first cellular telephone, the new device software package received from the second cellular telephone.

3. The method of claim 1, wherein the content further comprises additional content comprising at least a document, a photo, a video, a music file, or an application.

4. The method of claim 3, further comprising receiving, at the first cellular telephone, a selection in the authentication response, the selection comprising a pre-selection made by the first user of the additional content associated with the first user.

5. The method of claim 1, wherein the content further comprises a device restore package comprising backup content generated by a backup operation performed, at least in part, by the second cellular telephone.

6. The method of claim 3, further comprising receiving, at the first cellular telephone via the user interface, a selection of the additional content associated with the first user after receipt of the authentication response.

7. A cellular telephone comprising:
a user interface;
a processor; and
memory comprising computer-executable instructions that, when executed by the processor, cause the processor to perform operations comprising
receiving, via the user interface, an authentication credential as direct human input provided by a first user, who is acting as an authorizer, to affect an authorization for a second user to access, from the cellular telephone, content associated with the first user, wherein the cellular telephone is non-native to the first user in that the cellular telephone is not provisioned for the first user, and wherein the cellular telephone is native to the second user who is acting as an authorizee, in that the cellular telephone is provisioned for the second user;
in response to receiving the authentication credential as direct human input provided by the first user acting as the authorizer, generating an authentication request directed to an authentication system, wherein the authentication request comprises the authentication credential;
sending the authentication request to the authentication system;
receiving an authentication response from the authentication system, wherein the authentication response indicates that the first user is authenticated to authorize the second user for access to the content associated with the first user from the cellular telephone, wherein the cellular telephone comprises a first cellular telephone that the second user is using to replace a second cellular telephone, wherein the first user, who is acting as the authorizer, and the second user, who is acting as the authorizee, are a same individual, and wherein the content comprises a new device software package comprising information selected by the second user during a purchase transaction of the first cellular telephone for provisioning, at least in part, the first cellular telephone;
establishing a local data connection directly with the second cellular telephone;
requesting, via the local data connection, the new device software package from the second cellular telephone; and
receiving, via the local data connection, the new device software package from the second cellular telephone.

8. The cellular telephone of claim 7, wherein the operations further comprise installing the new device software package.

9. The cellular telephone of claim 7, wherein the content further comprises a device restore package comprising backup content generated by a backup operation performed, at least in part, by the second cellular telephone.

10. The cellular telephone of claim 7, wherein the content further comprises additional content comprising at least a document, a photo, a video, a music file, or an application.

11. The cellular telephone of claim 10, wherein the operations further comprise receiving, via the user interface, a selection of the additional content associated with the first user after receipt of the authentication response.

12. The cellular telephone of claim 10, wherein the operations further comprise receiving, via the user interface, a selection in the authentication response, the selection comprising a pre-selection made by the first user of the additional content associated with the first user.

13. A computer-readable storage medium comprising computer-executable instructions that, when executed by a processor of a cellular telephone, cause the processor to perform operations comprising:
receiving, via a user interface on the cellular telephone, an authentication credential as direct human input provided by a first user, who is acting as an authorizer, to affect an authorization for a second user to access, from the cellular telephone, content associated with the first user, wherein the cellular telephone is non-native to the first user in that the cellular telephone is not provisioned for the first user, and wherein the cellular telephone is native to the second user who is acting as an authorizee, in that the cellular telephone is provisioned for the second user;
in response to receiving the authentication credential as direct human input by the first user acting as the authorizer, generating an authentication request directed to an authentication system, wherein the authentication request comprises the authentication credential;
sending the authentication request to the authentication system;
receiving an authentication response from the authentication system, wherein the authentication response indicates that the first user is authenticated to authorize the second user for access to the content associated with the first user from the cellular telephone, wherein the cellular telephone comprises a first cellular telephone that the second user is using to replace a second cellular telephone, wherein the first user, who is acting as the authorizer, and the second user, who is acting as the authorizee, are a same individual, and wherein the content comprises a new device software package comprising information selected by the second user during a purchase transaction of the first cellular telephone for provisioning, at least in part, the first cellular telephone;
establishing a local data connection directly between the first cellular telephone and the second cellular telephone;
requesting, by the first cellular telephone via the local data connection, the new device software package from the second cellular telephone; and
receiving, at the first cellular telephone via the local data connection, the new device software package from the second cellular telephone.

14. The computer-readable storage medium of claim 13, wherein the content further comprises a device restore package comprising backup content generated by a backup operation performed, at least in part, by the second cellular telephone.

15. The computer-readable storage medium of claim 13, wherein the content further comprises additional content comprising at least a document, a photo, a video, a music file, or an application.

16. The computer-readable storage medium of claim 15, wherein the operations further comprise receiving, via the user interface, a selection of the additional content associated with the first user after receipt of the authentication response.

17. The computer-readable storage medium of claim 15, wherein the operations further comprise receiving, via the user interface, a selection in the authentication response, the selection comprising a pre-selection made by the first user of the additional content associated with the first user.

* * * * *